United States Patent [19]

Rader et al.

[11] Patent Number: 4,583,437
[45] Date of Patent: Apr. 22, 1986

[54] ROTARY CUTTER

[76] Inventors: Robert R. Rader; David Yanik, both of P.O. Box 96, 1105 Twenty-Fourth St., Port Huron, Mich. 48060

[21] Appl. No.: 596,142

[22] Filed: Apr. 2, 1984

[51] Int. Cl.⁴ .............................................. B23D 25/00
[52] U.S. Cl. ........................................ 83/304; 83/346; 83/481
[58] Field of Search ................ 83/304, 305, 337, 481, 83/346, 347, 698

[56] References Cited

U.S. PATENT DOCUMENTS

| 1,876,838 | 9/1932 | Biggert, Jr. | 83/305 X |
| 2,118,402 | 5/1938 | Hallden | 83/305 |
| 2,632,509 | 3/1953 | Skillman | 83/305 X |
| 3,074,303 | 1/1963 | Waters | 83/347 |
| 3,992,967 | 11/1976 | Fram | 83/347 |
| 4,095,498 | 6/1978 | Biggar | 83/346 |
| 4,188,843 | 2/1980 | Dickey | 83/346 X |

FOREIGN PATENT DOCUMENTS 217278  9/1961  Austria .................................. 83/305

Primary Examiner—James M. Meister

[57] ABSTRACT

A machine for cutting a continuous web into successive individual battery plates has a rigid frame on which a cylindrical rotary anvil is journalled. A rotary knife drum is fixed on a shaft journalled on a pair of laterally spaced upright plates mounted for vertical sliding movement on the frame of the machine. A toggle linkage is utilized to shift the drum mounting plates vertically between operative and inoperative positions. The knife drum shaft is journalled on one of the mounting plates such that the plate can be disengaged from the shaft and tilted laterally outwardly by simply removing a nut threaded on the end of the shaft.

10 Claims, 7 Drawing Figures

ROTARY CUTTER

This invention relates to a rotary cutter, and, more particularly, to a cut-off machine for battery plates.

Battery plates or grids are sometimes cast as a continuous web by means of continuous casting machines. After casting, the web is pasted and, after pasting, it is severed into successive individual plates. The art has developed to a point where such a web can be cast and pasted at a rate as high as 200 feet per minute. If an individual battery plate has a length of about 6" it follows that, if a battery plate production line using such equipment is to operate efficiently, the plate cutoff mechanism must be capable of severing the web accurately at a rate as high as 400 plates per minute. As a practical matter this can best be accomplished with a rotary cutter.

The thickness of a pasted plate for a lead-acid battery at the line of severing is frequently at least about 0.040 to 0.050". This thickness of lead presents considerable resistance to complete penetration by a cutter knife when the rotary cutter is operating at a high speed. Rotary cutters of conventional design are incapable of cutting lead alloy battery grids at the above-referred-to speed because at such speed the support for the rotary drum on which the knife blades are mounted yields in response to the speed of the drum and the resistance of the lead to knife penetration. The end result is that, at speeds in the range referred to, the knife blades of conventional rotary cutters do not completely penetrate through the plate web. Yielding of the support structure for the knife drum is due in part to the fact that the support structure must be designed to permit the drum to be easily removed for servicing and also to be easily separated from the anvil against which the drum rotates to initially introduce the web therebetween.

The primary object of this invention is to provide a rotary cutter designed for severing a continuous web of battery plates into individual plates at a relatively high speed.

A more specific object of this invention is to provide a rotary cutter of the type described constructed such that the rotary drum which supports the knife blades is mounted on a rigid support frame in a manner to prevent yielding thereof in the operative position while permitting the drum to be easily removed for servicing and to be separated from the anvil to permit the introduction of the plateweb therebetween.

Other objects, features and advantages of the present invention will become apparent from the following description and accompanying drawings, in which.

Figure 1:
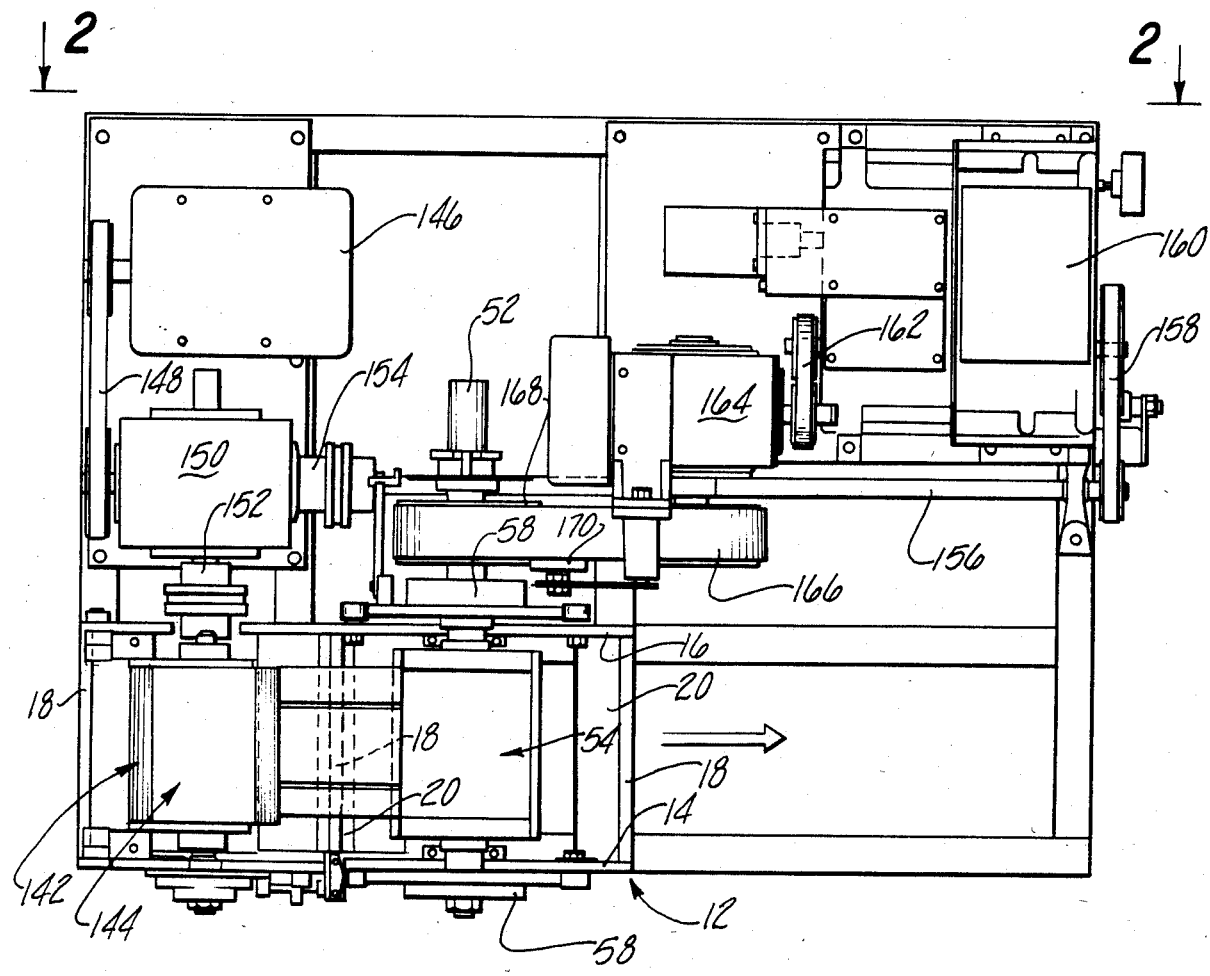
FIG. 1 is a plan view of a plate cut-off mechanism according to the present invention.

The machine of the present invention includes a main support frame 10 in the form of a weldment consisting essentially of a plurality of steel tubes and plates connected together to form rigid upright and horizontal support members. A rigid top frame 12 is mounted on the main frame 10. Top frame 12 includes a pair of laterally spaced, upright side walls 14,16 rigidly interconnected adjacent each end and adjacent the longitudinal central portion thereof by vertical cross bracing plates 18 and by a plurality of horizontal cross bars 20 extending between the lower edges thereof. Frame 12 is fixedly mounted on tubular members 22 which form a part of the rigid main frame 10 by means of bolts 24.

A shaft 26 extends between side walls 14,16 of frame 12. Each end of shaft 26 is fixedly mounted on the adjacent side wall by means of yoke plates 28 which are accurately located on and secured to the inner faces of the side walls by dowel pins and screws 30. A cylindrical anvil 32 is journalled on shaft 26 by means of bearings 34. With the above-described arrangement anvil 32 is accurately located on frame 12 for rotation about a precise horizontal axis. It will be noted that the opposite ends of anvil 32 and bearings 34 are disposed closely adjacent the yoke plates which support the opposite ends of shaft 26.

Adjacent the outer side of each side wall 14, 16 there is arranged on frame 12 cutter mounting side plates 36,38. Adjacent their lower ends side plates 36, 38 are interconnected by a rigid cross bar 40. Cross bar 40 has reduced end portions 42 which project laterally through correspondingly sized openings in plates 36,38. A retainer plate 44 is bolted to the reduced end portion 42 of cross bar 40 that extends through side plate 38 so as to securely clamp one end of the cross bar to plate 38. The opposite end of cross bar 40 has a retainer plate 46 bolted to the adjacent reduced end portion 42 against the outer face of plate 36. Retainer plate 46 has a rounded shoulder 48 at its upper end which is flush with the upper end of the adjacent reduced end portion 42 of the cross bar. The lower edge of cross bar 40 adjacent the inner face of mounting plate 36 is angularly relieved as at 50. The provision of the rounded shoulder 48 and the relieved portion 50 enables the mounting plate 36 to be tilted or pivoted from the solid line to the broken line position shown in FIG. 3.

Adjacent the upper end of the two side plates 36,38 there is journalled a shaft 52 on which a knife drum 54 is supported. Shaft 52 is supported on plates 36,38 by bearings 56 that are housed within retainers 58. Retainers 58 are fitted within openings formed in the two side plates and are secured thereto by means of screws 60 (FIG. 4). The outboard end portion of shaft 52 is tapered as at 62 and the inner race of the adjacent outboard bearing 56 is seated on a bushing 64 having a tapered bore matching the taper on the portion 62 of the shaft. The outboard end of shaft 52 is threaded to receive a nut 66 which, when tightened, firmly clamps the outboard bearing 56 (and side plate 36) in fixed axial position relative to shaft 52. The tapered portion 62 and the threaded end of the shaft are proportioned and dimensioned such that, when nut 66 is removed, side plate 36 (together with bearing 56, bushing 64 and retainer 58) can be pivoted laterally outwardly over the end of the shaft to the broken line position shown in FIG. 3.

Both plates 36,38 are guided for vertical movement on the respective side walls 14,16 of frame 12 by guide rollers 68. In addition, side plate 38 is retained in flatwise engagement with the outer face of side wall 16 by a pair of gib plates 70 (FIG. 2).

Figure 2:
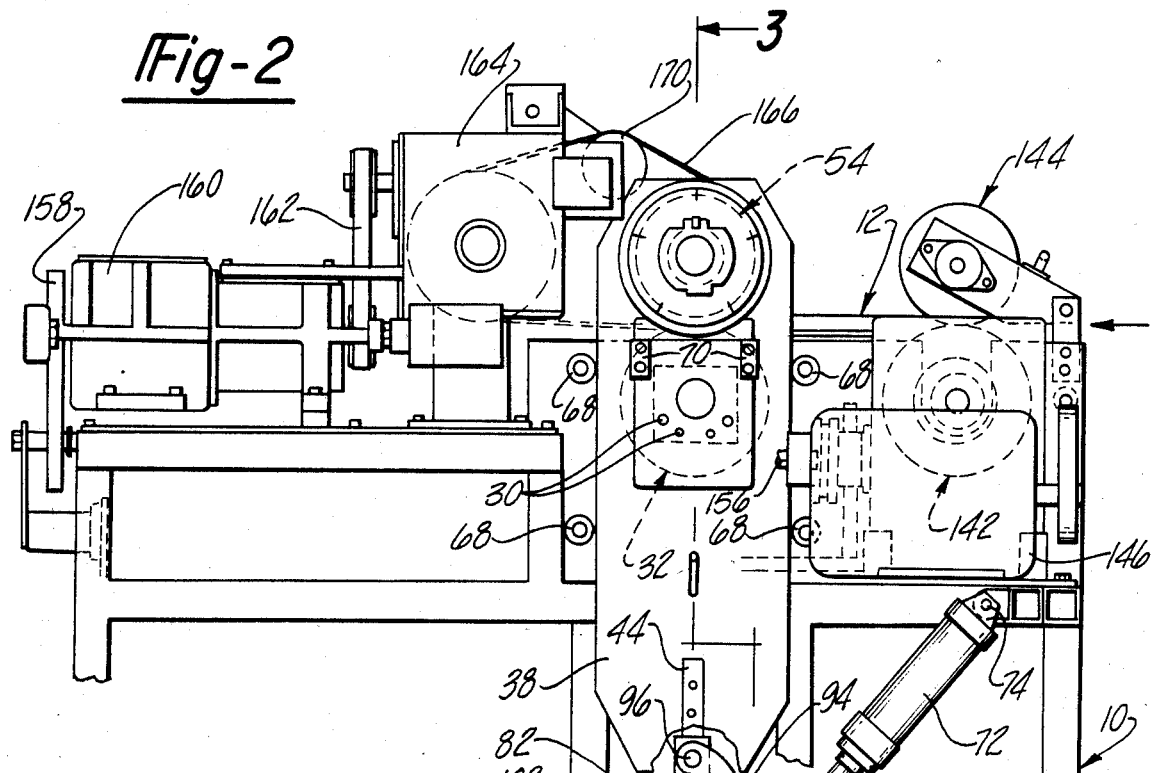
FIG. 2 is an elevational view as viewed in the direction of arrows 2—2 in FIG. 1.
Figure 5:
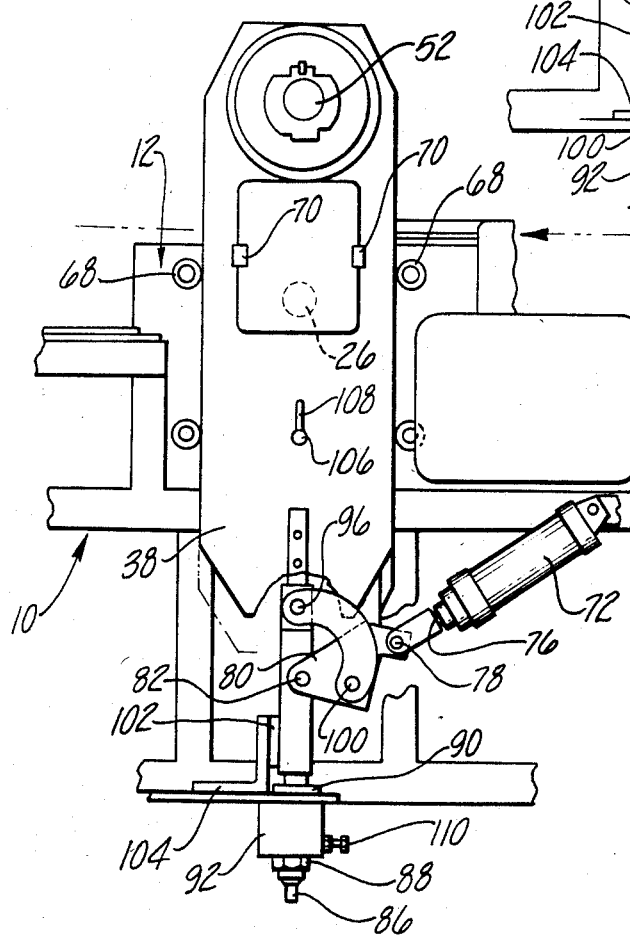
FIG. 5 is a fragmentary elevational view similar to FIG. 2 and showing the rotary knife drum shifted to the inoperative position.
Figure 3:
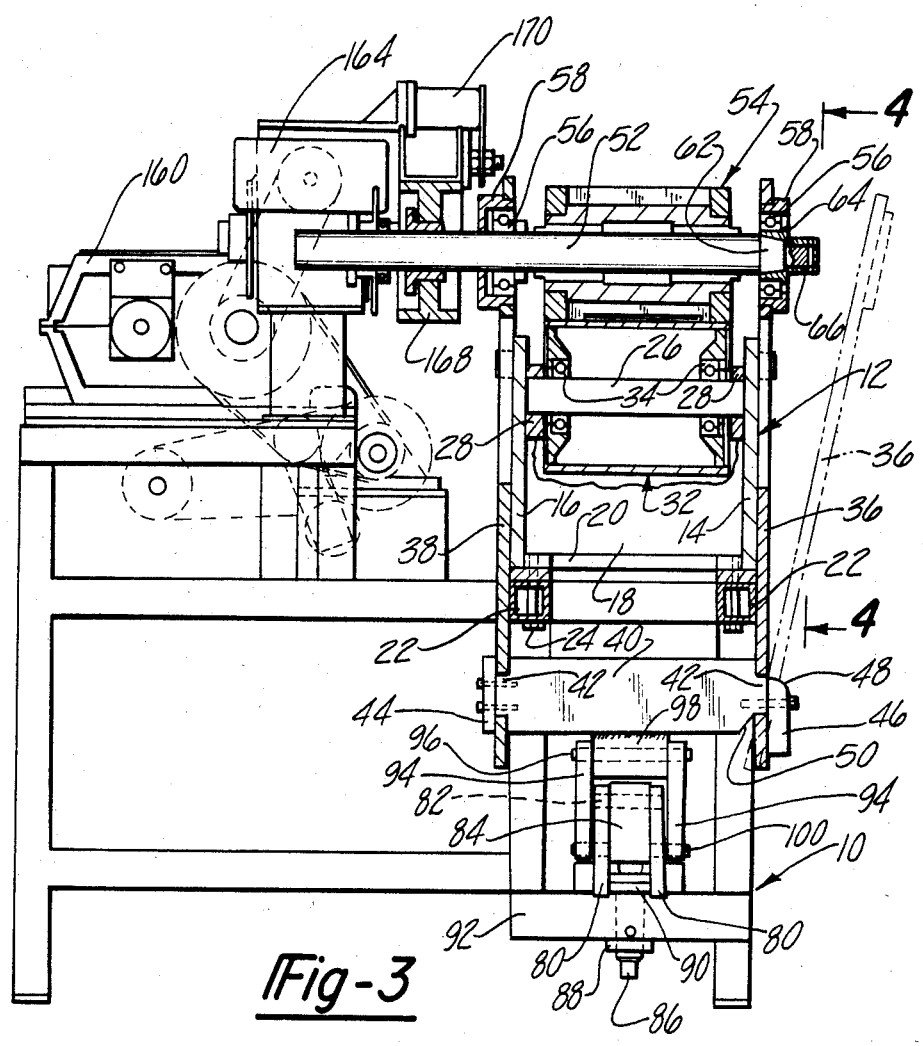
FIG. 3 is a sectional view taken along the line 3—3 in FIG. 2 with the cutter drum in the operative position.
Figure 4:
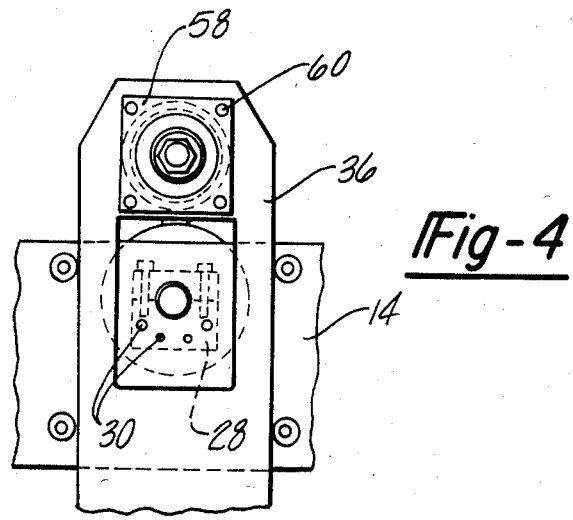
FIG. 4 is a fragmentary elevational view as seen in the direction of the arrows 4—4 in FIG. 3.

The means for raising and lowering side plates 36,38 are best illustrated in FIGS. 2, 3 and 5. These means consist of a pneumatic cylinder 72, the head end of which is pivotally supported on frame 10 as at 74. The distal end of piston rod 76 is pivotally connected as at 78 to a pair of links 80 which straddle and are pivotally connected as at 82 with a block 84. Block 84 is shiftable vertically by means of an adjusting screw 86 extending through threaded collars 88 and 90 located on vertically opposite sides of a rigid support block 92 on frame 10. The pivotal connection 82 between links 80 and block 84 can be raised and lowered by threading screw 86 into or out of block 84. A pair of arcuately shaped toggle links 94 straddle links 80 and are pivotally connected at their upper ends as at 96 to a lug 98 welded to the lower edge of cross bar 40. The lower ends of toggle links 94 are pivotally connected as at 100 to links 80.

In the operative position shown in FIG. 3 piston rod 76 is extended and rotates links 80 in a clockwise direction about the pivot axis 82 to the position wherein the links abut against a plate 102 affixed to an upstanding, laterally adjustable angle iron bracket 104 on frame 10. In this position pivot axes 96,100 are substantially vertically aligned with the pivot axis 82 and the side plates 36,38 are pulled downwardly and locked in their operative position. When piston rod 76 is retracted, links 80 are rotated counter-clockwise about the pivot axis 82 and the toggle links 94 shift plates 36,38 upwardly to the position shown in FIG. 5 wherein the knife drum 54 is spaced from and above the cylindrical anvil 32. The extent of vertical movement of plates 36,38 is limited by the stroke of cylinder 72. Shoulder screw 106 in side wall 16 of frame 12 which engages vertical slot 108 in side plate 38 serves to help stabilize side plate 38 when side plate 36 is pivoted to the open position. The lowermost position of the two side plates 36,38 is determined by the vertical adjustment of screw 86 which can be retained in its adjusted position by a locking screw 110.

Figure 6:
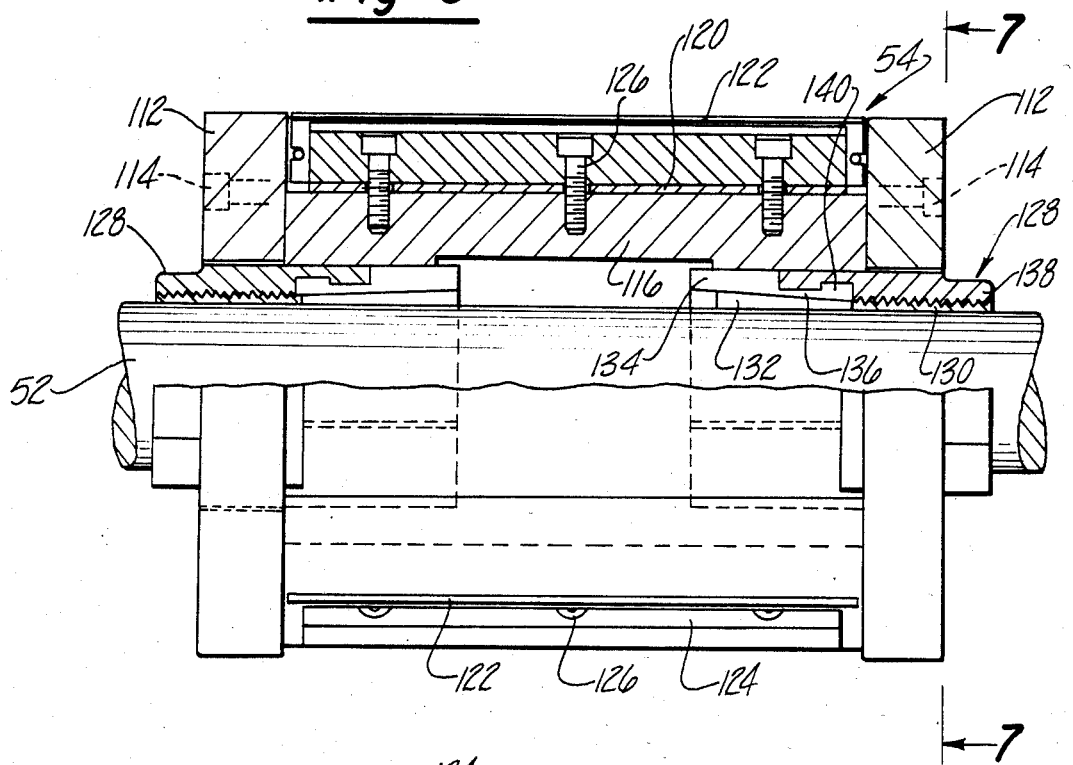
FIG. 6 is a fragmentary sectional view of the knife drum.
Figure 7:
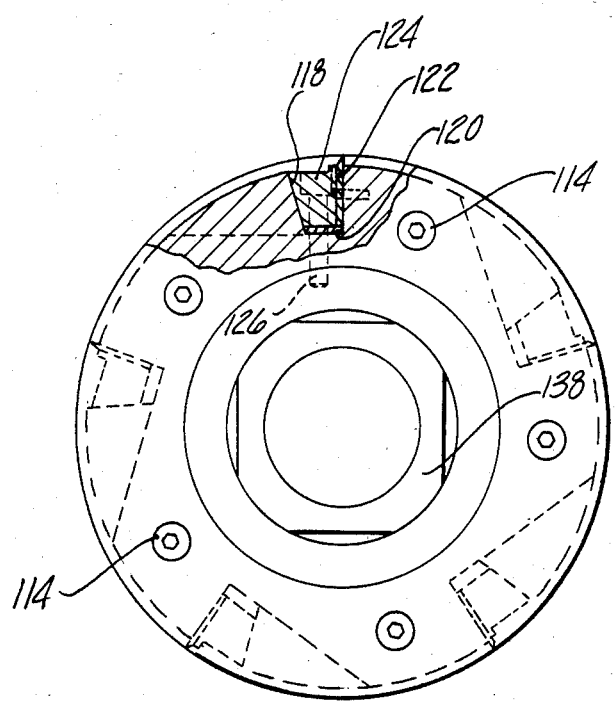
FIG. 7 is an end view of the knife drum with portions broken away as viewed along the line 7—7 in FIG. 6.

Referring now to FIGS. 6 and 7, drum 54 includes a pair of circular cylindrical end plates or rims 112 of annular shape which are secured as by screws 114 to the opposite ends of an annular body 116. The annular body 116 is formed around its periphery with a plurality of pockets 118 at the bottom of which is seated a blade support 120. The radially extending blades 122 are retained in the pockets by wedge blocks 124 secured in place by screws 126. When the blades 122 are properly arranged on the drum their radially outer edges define a cylinder having the same radius as the annular end plates 112. In the operative position of knife drum 54, that is, when the side plates 36,38 are locked in the lowermost position by the toggle mechanism described, the end plates 112 are in pressure rolling engagement with the cylindrical surface of anvil 32 and the radial outer edges of blades 122 are rotated successively into contact with the outer periphery of the anvil so as to sever a web fed therebetween.

Drum 54 is securely locked to shaft 52 by means of a pair of conventional locking collets 128. Each collet consists of a sleeve having a threaded portion 130 and an axially slotted collet section 132 that is surrounded by an axially split collet contractor collar 134. The collet section 132 and the sections of collar 134 have corresponding tapers as indicated at 136 so that, when the collar sections 134 are shifted axially inwardly toward each other, the collet sections 132 are forced into firm gripping engagement with the periphery of shaft 52 and the collar sections 134 are shifted radially outwardly into firm engagement with the inner periphery of body 116. The means for shifting the collar sections 134 axially comprise nuts 138 which are connected axially to the collar section 134 as at 140.

There is also journalled on frame 12 a rotary driven web feed roller 142 on which a weighted contacting roller 144 is supported. Referring to FIG. 1, the drive mechanism for knife drum 54 and web feed roller 142 is illustrated. This mechanism includes an electric motor 146 having a belt drive 148 with a gear reducer 150. Gear reducer 150 has first output shaft 152 coupled to web feed roller 142. A second output shaft 154 on gear reducer 150 is coupled to a shaft 156 that has a belt drive 158 with a transmission 160. The output of transmission 160 has a belt drive 162 with a second transmission 164 which in turn has a belt drive 166 with a pulley 168 mounted on the inboard end portion of shaft 52. A belt tensioning roller 170 enables the pulley 168 to be shifted vertically with side plates 36, 38 without affecting the drive to the knife drum 54.

We claim:

1. A machine for severing a continuous web into successive individual plates comprising, a rigid support frame, a rotary cylindrical anvil journalled on said frame for rotation about a rigidly fixed axis, a pair of laterally spaced plates supported on said frame for sliding movement in parallel planes perpendicular to the axis of rotation of the anvil, a shaft extending between said plates along an axis accurately parallel to the axis of rotation of the anvil, a pair of bearings fixedly mounted on said plates and in which said shaft is journalled for rotation, means for rotating said shaft, a drum supported on said shaft to rotate therewith, said drum having cylindrical surface portions which, when the drum is in operative position, are in rolling engagement with cylindrical portions of the anvil, a plurality of radially oriented knife blades extending axially of the drum and which, when the rotating drum is in operative position, cooperate with the outer periphery of the anvil to sever a web fed therebetween, rigid means extending across said interconnecting said plates at a location spaced from the anvil and drum, means for displacing said interconnecting means to shift the plates in a direction to move the drum to operative position in rolling engagement with the anvil and to an inoperative position wherein the periphery of the drum is spaced radially from the periphery of the anvil, and said displacing means has a first link pivotally mounted on said frame about a first axis, means for rotating said link through a limited arcuate extent, a toggle link pivotally connected adjacent one end to said rigid interconnecting means about a second axis and pivotally connected adjacent its other end to the rotatable link about a third axis spaced from said first axis.

2. A machine as called for in claim 1 wherein said displacing means is constructed and arranged to place said plates in tension when the drum is moved to said operative position.

3. A machine as called for in claim 1 wherein the axes of the drum and anvil extend horizontally and the drum is positioned above the anvil so that it is moved downwardly into said operative position.

4. A machine as called for in claim 1 including means for adjusting said first axis toward and away from said second axis.

5. A machine as called for in claim 1 wherein said bearings are located closely adjacent the inner faces of said plates and the opposite ends of said drum are disposed closely adjacent said bearings.

6. A machine as called for in claim 1 wherein said frame includes a pair of laterally spaced upright rigid supports, a shaft extending between said supports, means on the inner faces of said upright supports supporting the opposite ends of said last-mentioned shaft, said anvil being mounted on said shaft and having its opposite ends disposed closely adjacent said shaft supporting means.

7. A machine as called for in claim 1 wherein said bearings are located closely adjacent the inner faces of said plates and the opposite ends of said drum are disposed closely adjacent said bearings.

8. A machine for severing a continuous web into successive individual plates comprising, a rigid support frame, a rotary cylindrical anvil journalled on said frame for rotation about a rigidly fixed axis, a pair of laterally spaced plates supported on said frame for sliding movement in parallel planes perpendicular to the axis of rotation of the anvil, a shaft extending between said plates along an axis accurately parallel to the axis of rotation of the anvil, a pair of bearings fixedly mounted on said plates and in which said shaft is journalled for rotation, means for rotating said shaft, a drum supported on said shaft to rotate therewith, said drum having cylindrical surface portions which, when the drum is in operative position, are in rolling engagement with cylindrical portions of the anvil, a plurality of radially oriented knife blades extending axially of the drum and which, when the rotating drum is in operative position, cooperate with the outer periphery of the anvil to sever a web fed therebetween, rigid means extending across and interconnecting said plates at a location spaced from the anvil and drum, means for displacing said interconnecting means to shift the plates in a direction to move the drum to operative position in rolling engagement with the anvil and to an inoperative position wherein the periphery of the drum is spaced radially from the periphery of the anvil, said shaft has a tapered portion adjacent one end thereof, a bushing having a corresponding tapered bore seated on said tapered end portion, the bearing adjacent the tapered end portion being seated on said bushing, said tapered end portion terminating in a threaded section, a threaded member on said threaded section retaining said end of the shaft in assembled relation with the adjacent bearing, and the side plate on which the last-mentioned bearing is mounted being connected with said interconnecting means so that it can be pivoted laterally outwardly when said threaded member is removed to swing the bushing and the associated bearing over and out of engagement with the tapered end portion of the shaft.

9. A machine as called for in claim 8 wherein said threaded section comprises a threaded stud portion projecting axially outwardly beyond the side plate on which said last-mentioned bearing is mounted and said threaded member comprises a nut on said threaded stud portion.

10. A machine as called for in claim 8 wherein said interconnecting means comprises a cross bar rigidly connected at one end to the adjacent plate, the other end of the cross bar having a reduced portion extending through a correspondingly shaped opening in the adjacent plate, a retainer secured to said reduced portion, said retainer having a portion engaging the outer face of the pivotable plate to lock the plate to said other end of the cross bar, said retainer also having a rounded shoulder thereon to accommodate pivoting of the side plate on the reduced end portion of the cross bar.

* * * * *

UNITED STATES PATENT AND TRADEMARK OFFICE
CERTIFICATE OF CORRECTION

PATENT NO. : 4,583,437
DATED : April 22, 1986
INVENTOR(S) : Robert R. Rader and David Yanik It is certified that error appears in the above—identified patent and that said Letters Patent is hereby corrected as shown below:

In Column 4, line 43, (Claim 1, line 20 thereof), delete

"said" in the first instance, and insert -- and --

Signed and Sealed this

Eighth Day of July 1986

[SEAL]

Attest:

DONALD J. QUIGG

Attesting Officer

Commissioner of Patents and Trademarks